(12) United States Patent
Jain et al.

(10) Patent No.: US 7,356,161 B2
(45) Date of Patent: Apr. 8, 2008

(54) CLASS OF SYMMETRIC LATTICES FOR QUANTIZATION AND DATA EMBEDDING

(75) Inventors: Kamal Jain, Bellevue, WA (US);
Ramarathnam Venkatesan, Redmond, WA (US); M. Kivanc Mihcak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/858,967

(22) Filed: Jun. 1, 2004

(65) Prior Publication Data

US 2005/0265575 A1 Dec. 1, 2005

(51) Int. Cl.
*G06K 9/00* (2006.01)

(52) U.S. Cl. .................. 382/100; 382/295; 380/201

(58) Field of Classification Search ............... 382/100, 382/106, 112, 135–139, 168, 188, 191, 201, 382/232, 250, 274, 276, 277, 295, 305, 116, 382/119, 181; 380/201, 203, 258; 358/3.28
See application file for complete search history.

(56) References Cited

U.S. PATENT DOCUMENTS

| | | | | |
|---|---|---|---|---|
| 6,332,030 | B1* | 12/2001 | Manjunath et al. | 382/100 |
| 6,483,927 | B2* | 11/2002 | Brunk et al. | 382/100 |
| 6,873,711 | B1* | 3/2005 | Murakami et al. | 382/100 |
| 7,076,082 | B2* | 7/2006 | Sharma | 382/100 |

FOREIGN PATENT DOCUMENTS

EP 1376466 * 1/2004

OTHER PUBLICATIONS

"Watermarking via Optimization Algorithms for Quantizing Randomized Statistics of Image Regions", Mihcak et al., Proceedings of the 40th Annual Allerton Conference on Communication, Control, and Computing, Oct. 2002, 10 pages.
"Watermarking via Optimization Algorithms for Quantizing Randomized Image Characteristics", Mihcak et al., IEEE Transactions on Signal Processing, Special Issue on Secure Media, Nov. 2003, 30 pages.
"Cryptanalysis of Discrete-Sequence Spread Spectrum Watermarks", Mihcak et al., Proceedings of 5th International Information Hiding Workshop, Oct. 2002, 21 pages.
"Attacks on Digital Watermarks: Classification, Estimation-Based Attacks, and Benchmarks", Voloshynovskiy et al., IEEE Communications Magazine, Aug. 2001, pp. 2-10.
"Dirty-Paper Trellis Codes For Watermarking", Miller et al., IEEE ICIP, vol. 2, 2002, pp. II-129 to II-132.
"Discrete differential calculus: graphs, topologies, and gauge theory", Dimakis et al., Journal of Mathematical Physics, vol. 35, No. 12, Dec. 1994, pp. 6703-6735.
"A Blind Watermarking Scheme Based on Structured Codebooks", Eggers et al., Institution of Electrical Engineers, 2000, pp. 4/1 to 4/21.
"General Blind Watermark Schemes", Yongliang et al., IEEE, 2002, pp. 143-149.
"Data embedding method for disclosing betrayers in collusion attack", Minami, N., Journal of the Institute of Image Electronics Engineers of Japan, vol. 30, No. 1, Jan. 2001, pp. 2-10.
Kivanc Mihcak, M. et al: "Blind image watermarking via derivation and quantization of robust semi-global statistics" 2002 IEEE Internation Conference on Acoustics, Speech and signal Processing. Orlando, FL, May 13-17, 2002.

* cited by examiner

*Primary Examiner*—Seyed Azarian
(74) *Attorney, Agent, or Firm*—Lee & Hayes, PLLC (57) ABSTRACT

Methods and systems for quantization and data embedding are described. In at least some embodiments, a transform is applied on an image that is to be watermarked and statistics associated with the image are computed. The computed statistics are quantized using a symmetric lattice, and a watermark is computed using the lattice quantized statistics. The watermark is then inserted into the image.

36 Claims, 5 Drawing Sheets

CLASS OF SYMMETRIC LATTICES FOR QUANTIZATION AND DATA EMBEDDING

TECHNICAL FIELD

This invention relates to quantization and data embedding methods and systems.

BACKGROUND

Watermarking refers to the process by which a digital image has a mark embedded in it. Embedded watermarks can indicate such things as the owner of the image, the entity to which the image was distributed, and the like. Not surprisingly, watermarked images can come under attack by unscrupulous individuals who desired to steal or otherwise use the image in an unauthorized manner. There are many different ways that these individuals can use to attack a watermark. Thus, it becomes important to design watermarking systems with an appreciation of the types of attacks that can be waged against watermarked images.

Accordingly, this invention arose out of concerns associated with providing improved watermarking systems and methods.

SUMMARY

Methods and systems for quantization and data embedding are described. In at least some embodiments, a transform is applied on an image that is to be watermarked and statistics associated with the image are computed. The computed statistics are quantized using a symmetric lattice, and a watermark is computed using the lattice quantized statistics. The watermark is then inserted into the image.

DETAILED DESCRIPTION

Overview

In the illustrated and described embodiment, a class of symmetric lattices that are suitable for quantization and data embedding purposes is introduced. As will be demonstrated below, for an arbitrary dimension n, symmetric lattices admit a linear (in n) time algorithm for quantizing a given vector to the nearest lattice point. The proposed lattice construction includes the well-known $A_n$ lattices as a special case. Such lattices are discussed in J. H. Conway and N. J. A. Sloan, *Sphere Packings, Lattices and Groups*, Springer-Verlag, 1988. As an application of the proposed lattice construction, a given signal is mapped into a suitable pseudo-randomly formed statistics vector, which is subsequently quantized using a symmetric lattice.

As will be appreciated by the skilled artisan in view of the discussion in this document, the quantized statistics vector can be used for identification or authentication purposes. Accordingly, this document discusses a consideration of the task of data embedding in signals via designing the embedded mark, such that the statistics vector of the mark-embedded signal is the lattice-quantized version of the statistics vector of the unmarked signal. In conjunction with these embedding activities, a measure is defined and referred to as the yield. The yield is the ratio of the packing radius to the covering radius of the lattice. The inventive approach derives the optimal symmetric lattice in the sense of yield. The effort for constructing larger dimension lattices is motivated by the design of watermarking systems that are resistant to estimation attacks. See, e.g. M. K. Mihcak, R. Venkatesan, and M. Kesal, "Watermarking via Optimization Algorithms for Quantizing Randomized Statistics of Image Regions," *Proceedings of the 40th Annual Allerton Conference on Communication, Control and Computing*, Monticello, Ill., October 2002; M. K. Mihcak, R. Venkatesan, and T. Liu, "Watermarking via Optimization Algorithms for Quantizing Randomized Image Characteristics," submitted to *IEEE Transactions on Signal Processing, Special Issue on Secure Media*, November 2003.

The larger the dimension of the ambient space, the smaller is the effectiveness of such estimation attacks, which under suitable assumptions can be precisely characterized. As examples of estimation attacks, the reader is referred to M. K. Mihcak, R. Venkatesan, and M. Kesal, "Cryptanalysis of Discrete-Sequence Spread Spectrum Watermarks," *Proceedings of 5th International Information Hiding Workshop* (IH 2002), Noordwijkerhout, The Netherlands, October 2002; and S. Voloshynovskiy, S. Pereira, T. Pun, J. J. Eggers and J. K. Su, "Attacks on Digital Watermarks: Classification, Estimation-based Attacks and Benchmarks," *IEEE Communications Magazine*, Vol. 39, No. 8, pp. 118-127, August 2001. For design examples which are robust to estimation attacks, the reader is referred to M. K. Mihcak, R. Venkatesan, and M. Kesal, "Watermarking via Optimization Algorithms for Quantizing Randomized Statistics of Image Regions," *Proceedings of the 40th Annual Allerton Conference on Communication, Control and Computing*, Monticello, Ill., October 2002; M. K. Mihcak, R. Venkatesan, and T. Liu, "Watermarking via Optimization Algorithms for Quantizing Randomized Image Characteristics," submitted to *IEEE Transactions on Signal Processing, Special Issue on Secure Media*, November 2003.

In the discussion that follows, the following notation will be used. Lowercase boldface letters denote real vectors and uppercase boldface letters denote real matrices. Subscripts denote individual elements of these vectors or matrices. For instance $a_i$ and $A_{ij}$ denote the i-th element of a real vector a and the (i, j)-th element of a real matrix A respectively. In the discussion that follows, an assumption is made that vectors are column vectors and the Euclidean norm is the used metric unless otherwise specified.

The discussion first starts with presentation of symmetric lattices and a quantization algorithm in the section entitled "Symmetric Lattices and A Linear-Time Quantization Algorithm" just below. Following presentation of this material, a section entitled "Mark Embedding" describes how the quantization algorithm is applied in the context of watermarking.

Symmetric Lattices and A Linear-Time Quantization Algorithm

In this section, the class of symmetric lattices is defined. A linear-time quantization algorithm is given for the class the optimal symmetric lattice for data embedding applications in the sense of yield is found.

Definition 2.1 The symmetric lattice $L_n(\alpha)$ (parameterized by $\alpha$) is defined as $$L_n(\alpha) \triangleq \left\{ v \mid v = \sum_{i=1}^{n} z_i v^i, z_i \in \mathbb{Z}, 1 \leq i \leq n \right\}$$

where $\forall i, v_i \in \mathbb{R}^n$ and $$<v^i, v^j> = \begin{cases} 1 & \text{if } i = j \\ \alpha & \text{if } i \neq j \end{cases} \quad (2.1)$$

It should be noted that the symmetric lattice with $\alpha=\frac{1}{2}$ in n-dimensions is known as the $A_n$ lattice in the literature (up to a scaling factor). These lattices have several optimality properties. For a detailed comprehensive discussion, the reader is referred to Chapters 1 and 6 in J. H. Conway and N. J. A. Sloan, *Sphere Packings, Lattices and Groups*, Springer-Verlag, 1988. It should be appreciated and understood that in Equation 2.1 above, the symmetric lattice is defined to have the same angle $\alpha$ for i distinct from j. It is also possible, for i distinct from j, to select each angle $\alpha$ from a probability distribution concentrated around $\alpha$, with $\alpha$ as the mean. Doing so, one can expect the algorithms to perform similarly on average. Further weakenings can be made to make the angle to be concentrated to be around different alphas for each distinct pair of i, j. It is to be appreciated that one can publish this lattice by applying a unimodular transform to the basis of the lattice.

Definition 2.2 A lattice matrix $L_n(\alpha)$ for $L_n(\alpha)$ is an $n \times n$ real matrix, whose rows are in $\mathbb{R}^n$ and satisfy (2.1) above.

In the next two sub-sections, the first sub-section describes an algorithm for constructing a lattice matrix $L_n(\alpha)$. The second subsection describes an algorithm for quantization to a symmetric lattice $L_n(\alpha)$.

An Algorithm for Constructing $L_n(\alpha)$

The first step in constructing a symmetric lattice $L_n(\alpha)$ is to, without loss of generality, pick $v^1$ such that $v_1^1=1$ and $v_i^1=0$, $2 \leq i \leq n$. Next, $v^2$ is generated such that $v_1^2=\alpha$, $v_2^2=\sqrt{1-\alpha^2}$ and $v_i^2=0$, $3 \leq i \leq n$. Now, for each i, $3 \leq i \leq n$, given $v^{i-1}$, generate $v^i$ as follows:

1. $v_j^i = v_j^{i-1}, 1 \leq j \leq i-2$.

2. $v_{i-1}^i = \left( \alpha - \sum_{j=1}^{i-2} (v_j^i)^2 \right) / v_{i-1}^{i-1}$.

3. $v_i^i = \sqrt{1 - \sum_{j=1}^{i-1} (v_j^i)^2}$.

4. $v_j^i = 0, i+1 \leq j \leq n$.

Now, all of the $\{v_i\}_{i=1}^n$ are combined to form $L_n(\alpha)$ More specifically, enumerated steps 1-4 collectively define individual rows of the lattice matrix $L_n(\alpha)$. Performing these steps n times defines an n-dimension lattice matrix.

Definition 2.3 A lattice matrix $M_n(\alpha)$ for $L_n(\alpha)$ is an $n \times n+1$ real matrix, whose rows are in $\mathbb{R}^{n+1}$ and satisfy (2.1).

It should be noted that it is straightforward to construct $M_n(\alpha)$ using the following rule: For all $1 \leq i \leq n$, the (i, j) entry of $M_n(\alpha)$ is equal to $\sqrt{\alpha}$ if $j=1$, $-\sqrt{1-\alpha}$ if $j=i+1$, and 0 everywhere else $1<j<n+1$. Furthermore, it can be shown that the rows of both $L_n(\alpha)$ and $M_n(\alpha)$ satisfy (2.1) above.

An Algorithm for Quantization to $L_n(\alpha)$

Assume now that we are given an input vector $x1 \in \mathbb{R}^{n+1}$ of size $1 \times n$ to be quantized to $L_n(\alpha)$. Here, $[\cdot]$ denotes rounding to nearest integer operator. In accordance with the illustrated and described embodiment, $L_n(\alpha)$ and $M_n(\alpha)$ are generated as described above. Next, the input vector x1 is mapped into the n+1 dimension to provide x2 as follows:

$$x2 = x1(L_n(\alpha))^{-1} M_n(\alpha).$$

Now, x3 is generated such that:

$$x3_i = \begin{cases} x2_i / \sqrt{\alpha} & \text{if } i = 1 \\ x2_i / \sqrt{1-\alpha} & \text{else} \end{cases}$$

Having found x3, x4 is computed such that $x4_i=[x3_i]$, $1 \leq i \leq n+1$. Now, the difference between x4 and x3 is computed to provide $f=x4-x3$ and q is calculated as follows:

$$q = \sum_{i=1}^{n+1} f_i.$$

Depending on the value of q, processing can take different paths. That is, q can be equal to, greater than, or less than 0. In each of these instances, processing to arrive at a quantized output is performed somewhat differently.

Processing when q=0

In the event that the computed value of q=0, the quantization output $\hat{x}$ in $\mathbb{R}^{n+1}$ is generated as follows:

$$\hat{x}_i = \begin{cases} (\sqrt{\alpha}) x4_i & \text{if } i = 1 \\ (\sqrt{1-\alpha}) x4_1 & \text{else} \end{cases}$$

Given the quantization output in $\mathbb{R}^{n+1}$, the quantization output in $\mathbb{R}^n$ is now computed as follows:

$$\hat{x} M_n^T(\alpha) L(\alpha)^{-T}$$

Processing when q>0

In the event that the computed value of q>0, the quantization output $\hat{x}$ in $\mathbb{R}^{n+1}$ is generated as follows:

1. First, define $h=f_1$ and define $g \in \mathbb{R}^n$ such that $g_i=f_{i+1}$, $1 \leq i \leq n$.
2. Sort g in descending order and record the sorting permutation.
3. Find $$t^* = \operatorname{argmin}_{0 \leq t \leq q} \alpha(h-t)^2 + (1+\alpha) \sum_{i=1}^{n} \tilde{g}_i^2,$$

-continued where $$\tilde{g}_i = \begin{cases} g_i - 1 & \text{if } 1 \leq i \leq (q-t) \\ g_i & \text{else} \end{cases}$$

4. Form $f^* \in \mathbb{R}^{n+1}$ where $$f_i^* = \begin{cases} h - t^* & \text{if } i = 1 \\ g_{i+1} - 1 & \text{if } 2 \leq i \leq (q - t^* + 1) \\ g_{i+1} & \text{else} \end{cases}$$

5. Permute $f^*$ using the inverse of the sorting permutation from step 2 above.
6. Generate the quantization output $\hat{x}$ in $\mathbb{R}^{n+1}$ as follows:

$$\hat{x}_i = \begin{cases} (\sqrt{\alpha})[x3_i + f_i^*] & \text{if } i = 1 \\ (\sqrt{1-\alpha})[x3_i + f_i^*] & \text{else} \end{cases}$$

7. Given the quantization output in $\mathbb{R}^{n+1}$, the quantization output in $\mathbb{R}^n$ is now computed as follows:

$$\hat{x} M_n^T(\alpha) L(\alpha)^{-T}$$

Processing when q<0

In the event that the computed value of q<0, the quantization output $\hat{x}$ in $\mathbb{R}^{n+1}$ is generated as follows:

1. First, define $h = f_1$ and define $g \in \mathbb{R}^n$ such that $g_i = f_{i+1}$, $1 \leq i \leq n$.
2. Sort g in ascending order and record the sorting permutation.
3. Find $$t^* = \text{argmin}_{0 \leq t \leq |q|} \alpha(h+t)^2 + (1-\alpha) \sum_{i=1}^{n} \tilde{g}_i^2,$$

where $$\tilde{g}_i = \begin{cases} g_i + 1 & \text{if } 1 \leq i \leq (|q| - t) \\ g_i & \text{else} \end{cases}.$$

4. Form $f^* \in \mathbb{R}^{n+1}$ where $$f_i^* = \begin{cases} h + t^* & \text{if } i = 1 \\ g_{i+1} + 1 & \text{if } 2 \leq i \leq (|q| - t^* + 1) \\ g_{i+1} & \text{else} \end{cases}.$$

5. Permute $f^*$ using the inverse of the sorting permutation from step 2 in this sub-section.
6. Generate the quantization output $\hat{x}$ in $\mathbb{R}^{n+1}$ as follows:

$$\hat{x}_i = \begin{cases} (\sqrt{\alpha})[x3_i + f_i^*] & \text{if } i = 1 \\ (\sqrt{1-\alpha})[x3_i + f_i^*] & \text{else} \end{cases}$$

7. Given the quantization output in $\mathbb{R}^{n+1}$, the quantization output in $\mathbb{R}^n$ is now computed as follows:

$$\hat{x} M_n^T(\alpha) L(\alpha)^{-T}$$

Lemma 2.1 The algorithm correctly outputs the closest vector to the given vector x1.

A proof outline of this Lemma is as follows. If q=0 note that x4 is already the lattice vector in $\mathbb{R}^{n+1}$ space. Moreover, x4 is co-ordinate wise closest to x3. This proves the claim for the case when q=0. In the case where q>0, then we need to subtract q from the sum of all the co-ordinates. The first co-ordinate could be special because α may not be equal to 1−α. Accordingly, the algorithm tries all possibilities with respect to the first co-ordinates. Suppose the algorithm subtracts t from the first co-ordinates, then the algorithm needs to subtract an additional q−t from the other co-ordinates. Note that the penalty, in terms of L2 norm, of subtracting 2 from any co-ordinate (not the first) is more than subtracting 1 from two different co-ordinates (again not the first) which were rounded up. Accordingly, it is better to decrease 1 from q−t different co-ordinates. Again the co-ordinates which are rounded up the most gives us the lowest penalty, in terms of L2 norm, if they are rounded down. This is precisely what the algorithm does. A similar argument applies to the case of q<0.

Lemma 2.2 The complexity of the quantization algorithm is linear in n in the worst case.

Theorem 2.3 Given n, the optimal symmetric lattice for watermarking is $L_n$ (0.5) in the sense that it maximizes yield, where yield is defined as the ratio of "minimum attack distortion to move to another lattice cell" (packing radius) and "maximum embedding distortion in lattice quantization" (covering radius).

A proof outline of the above is as follows. Let us first find out the yield for the case of $L_n$ (0.5). We will then show that the yield of $L_n$ (0.5) is an upper bound on the yield for any other $L_n$. Instead of $L_n$, it is more convenient to work with $M_n$. Note that the minimum attack distortion to move to another lattice cell is half the length of the shortest non-zero lattice vector. The length of the shortest non-zero lattice vector is 1 (at least two co-ordinates have to be non-zero). So, the norm of the minimum attack noise to move to another lattice cell is 1/2. Next, we compute the maximum embedding distortion induced by lattice quantization. Assume that n+1 is even. Asymptotically, this assumption is insignificant. A careful technical analysis shows that the worst vector to round is $\sqrt{0.5}(-0.5, +0.5, -0.5, \ldots, +0.5)$ in $\mathbb{R}^{n+1}$ space in the L2 norm sense. In that case, every coordinate is rounded by at least $\sqrt{0.5}/2$. Hence, the maximum embedding distortion would be $\sqrt{0.5(n+1)}0.5$. This gives the yield of $\sqrt{2/(n+1)}$. Note that this is 41% more than the orthogonal lattice (i.e., the symmetric lattice for α=0), which is the case of scalar quantization.

Now, we prove that the yield for α=½ is an upper bound on the yield for 0<α<1, α≠½. For this, it is sufficient to show an upper bound on the "minimum attack distortion to move to another lattice cell" and a lower bound on the "maximum embedding distortion in lattice quantization" and show that the bounds are attained by α=½. We divide our task in two parts, first α<0.5, and then α>0.5, still working in $\mathbb{R}^{n+1}$ space.

If α<0.5, one can choose one of the rows of $M_n$ as an upper bound on the shortest non-zero lattice vector. Half of it is an upper bound on the "minimum attack distortion to move to another lattice cell", whose norm is ½. Next, we take $-0.5(\sqrt{\alpha}), +0.5(\sqrt{1-\alpha}), -0.5(\sqrt{1-\alpha}), \ldots, +0.5(\sqrt{1-\alpha})$ as a vector to be rounded to the nearest lattice point. We compute the minimum distortion needed to quantize this vector to the nearest lattice point and that will be a lower bound on the maximum embedding distortion. Coordinate-wise, the minimum distortion needed is $0.5\sqrt{1-\alpha}$ except for the first coordinate for which the minimum distortion is $0.5\sqrt{\alpha}$. So, we get $1/\sqrt{\alpha+n(1-\alpha)}$ as an upper bound on the yield for $0<\alpha<\frac{1}{2}$. The supremum of $1/\sqrt{\alpha+n(131\alpha)}$ in $0<\alpha<\frac{1}{2}$ is $\sqrt{2/(n+1)}$, which is the yield of $L_n$ (0.5).

If $\alpha>0.5$, one can choose the difference of the first two rows of $M_n$ as an upper bound on the shortest non-zero lattice vector. Half of this is $\sqrt{(1-\alpha)/2}$. We take the same vector $-0.5(\sqrt{\alpha}),+0.5(\sqrt{1-\alpha}),-0.5(\sqrt{1-\alpha}),\ldots,+0.5(\sqrt{1-\alpha})$ to compute a lower bound on the maximum embedding distortion. Again, using the same method, we get $\sqrt{2/(n+(\alpha/(1-\alpha)))}$ as an upper bound on the yield. This upper bound is smaller than the yield we computed for the case of $\alpha=0.5$. Hence the proof outline.

Mark Embedding

The problem of mark embedding is also termed "watermarking" in the literature. Within the class of watermarking problems, we consider the verification problem, i.e., the receiver makes one of the following two decisions: The received signal is watermarked or not watermarked. We do not consider the decoding problem, where the receiver a-priori knows the presence of embedded information and tries to decode it.

In the discussion below, an embedding algorithm is provided and an assumption is made that a secret key K is shared by both the embedder and the receiver. K, which should be unknown by the attacker, is used as the seed of a secure pseudo random number generator (PRNG) in the randomized steps of the is algorithm described just below. Hence, the randomized steps of the algorithm described below indeed looks random to the attacker. However, the randomized steps are known by both the embedder and the receiver. In the discussion that follows, the algorithm is stated for descriptions for grayscale images of size 512×512; however, it should be noted that an extension of this algorithm can easily be designed for other types of signals, such as colored images of various sizes and audio signals.

Embedding Algorithm Overview

Figure 1:
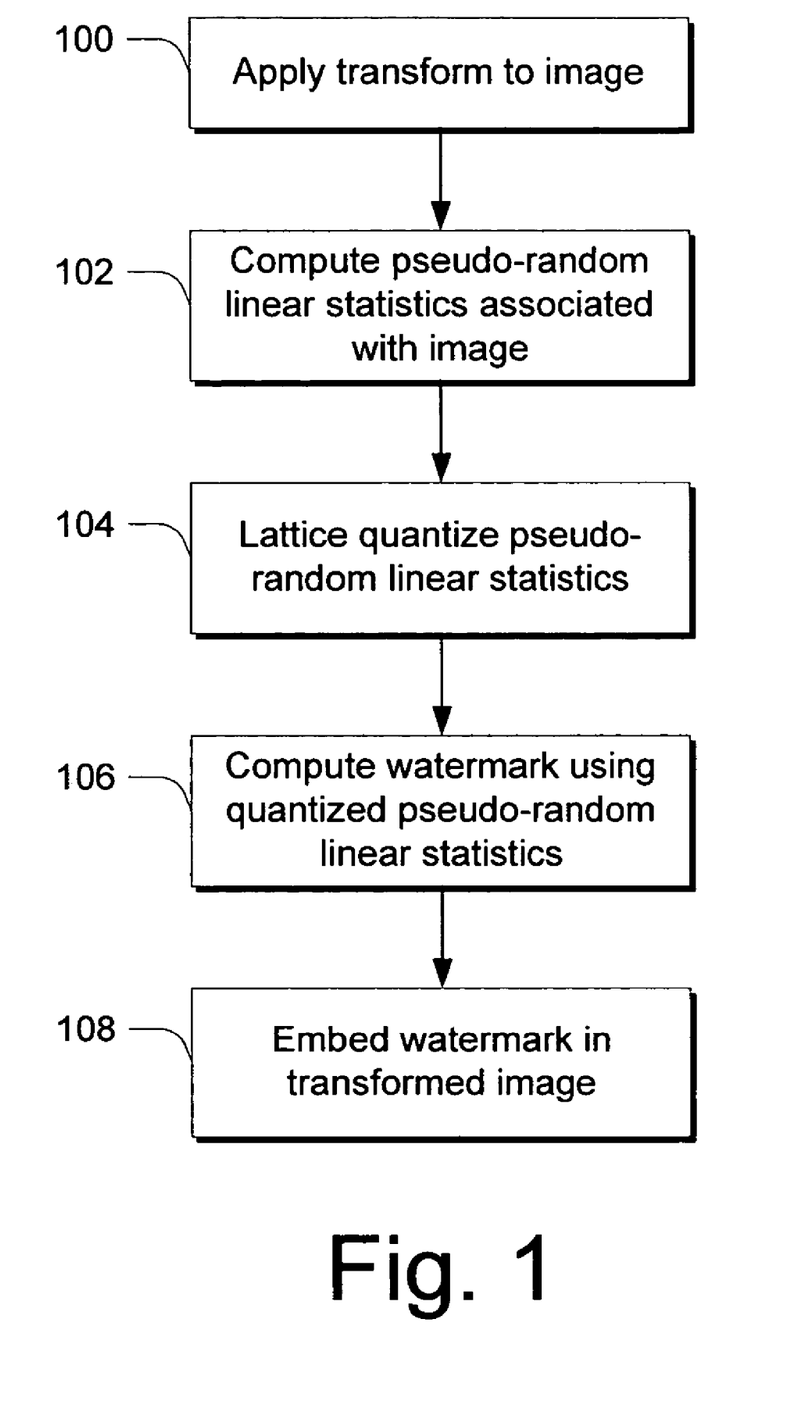
FIG. 1 is a flow diagram that describes steps in a method in accordance with one embodiment.

FIG. 1 is a flow diagram that illustrates steps in an embedding algorithm in accordance with the described embodiment. The method can be implemented in connection with any suitable hardware, software, firmware or combination thereof. In addition, the method about to be described can reside in the form of computer-readable instructions that reside on a computer-readable media. These instructions, when processed by a computer or computing system, can implement the method about to be described.

Given an image I, step 100 applies a transform to the image. In the illustrated and described embodiment, a 3-level discrete wavelet transform is applied on the image. Let S (size n×n) denote the low frequency subband for both the horizontal and vertical directions. Step 102 computes pseudo-random linear statistics associated with the image. In the illustrated and described embodiment, this step computes statistics a (size m×1) from S. An example of how this can be done is described in detail in FIG. 2. Step 104 lattice quantizes the pseudo-random linear statistics. The general notion of lattice quantization is described above. An example of how this lattice quantization is carried out in connection with mark embedding is described in detail in FIG. 3. Step 106 computes a watermark using the quantized pseudo-random linear statistics. An example of how this is done in the present embodiment is described in detail in FIG. 4. Once the watermark is computed, step 108 embeds the watermark in the transformed image from step 100.

Computation of Pseudo-random Linear Statistics

Figure 2:
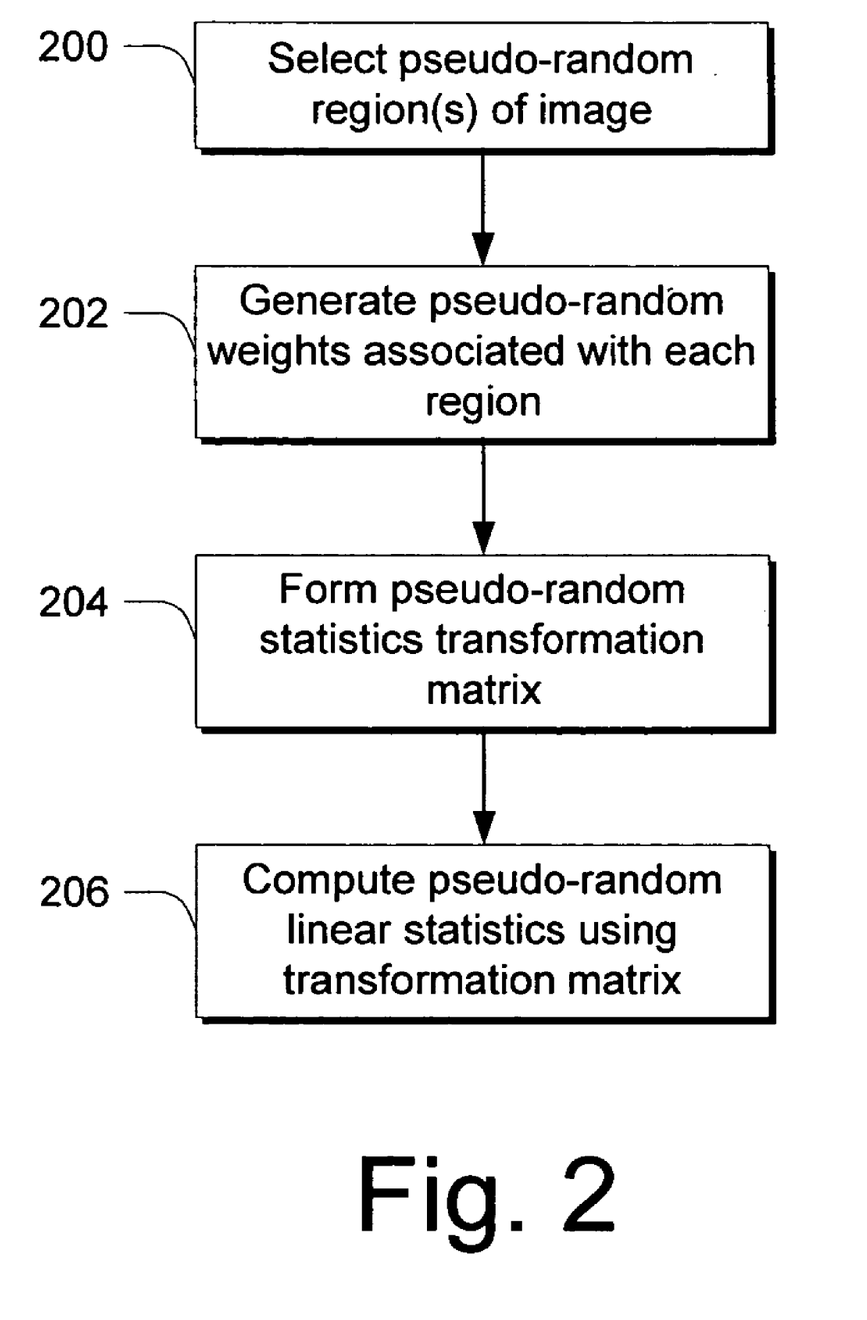
FIG. 2 is a flow diagram that describes steps in a method in accordance with one embodiment.

FIG. 2 is a flow diagram that describes steps in a method for computing pseudo-random linear statistics in accordance with one embodiment. Step 200 selects one or more pseudo-random regions of the image. The regions can comprise any suitably-shaped regions such as rectangles, squares and the like. For purposes of the ongoing discussion, the shape of the region(s) is square. For the i-th square, the method generates its size $l_i$ as the realization of a uniform random variable from the interval $[l_L, l_H]$. The coordinates of its upper left corner ($loc_{xi}$; $loc_{yi}$) are generated as independent realizations of a uniform random variable from the interval $[n-l,+1]$.

Step 202 generates pseudo-random weights associated with each region. In the illustrated and described embodiment, for each square i, $1 \leq i \leq m$, the method first forms a matrix $P^i$ (size $l_i \times l_i$) such that $P_{jk}^i$ is independently generated from unit-variance 0-mean Gaussian distribution, $1 \leq j,k \leq l_i$. The method next projects $P^i$ to the subspace spanned by all size $l_i \times l_i$ matrices that are bandlimited to frequency $0<f_{weight}<1$, let $\tilde{P}^i$ be the outcome of the projection. Then the method scales each $\tilde{P}_{jk}^i$, $1 \leq j,k < l_i$ such that the L2-norm of the outcome is N. Let $Q_i$ be the size $l_i \times l_i$ matrix obtained by scaling.

Step 204 forms a pseudo-random statistics transformation matrix. This step effectively prepares a linear operator transformation matrix for computation of the pseudo-random linear statistics described below. In the illustrated and described embodiment, for each square i, the method initially generates an all-0 matrix R (size n×n). The method then forms $R^i$ by replacing the i-th square entries with $Q^i$ (via using $l_i$ and ($loc_{xi}$, $loc_{yi}$) in the replacement). The method then re-orders elements of $R^i$ to form a $1 \times n^2$ vector $r^i$; where $r^i$ forms the i-th row of T (size $m \times n^2$)

Having formed the pseudo-random statistics transformation matrix T, step 206 computes pseudo-random linear statistics a using the transformation matrix. This step effectively computes the linear statistics using both the location and weights of the selected regions. In the illustrated and described embodiment, the pseudo random linear statistics are found by a=Ts, where s (size $n^2 \times 1$) is formed by re-ordering elements of S.

The process described above embellishes the processing that was previously described in connection with step 102 in FIG. 1. In the next sub-section, the discussion embellishes the processing that takes place in step 104 in FIG. 1—that of lattice quantizing the pseudo-random linear statistics.

Lattice Quantization of Statistics

As noted above, FIG. 3 describes steps in a method for lattice quantizing the pseudo-random linear statistics just described. In the discussion that follows, the linear statistics a are quantized to b (both are size m×1) using a lattice L($\alpha$) and a distortion constraint $\beta$ using the following steps. It is to be noted that in the construction to be described, the parameter $\alpha$ uniquely determines a symmetric lattice $L_m(\alpha)$. The properties of the considered lattices and a linear-time quantization algorithm for them have been discussed above.

Figure 3:
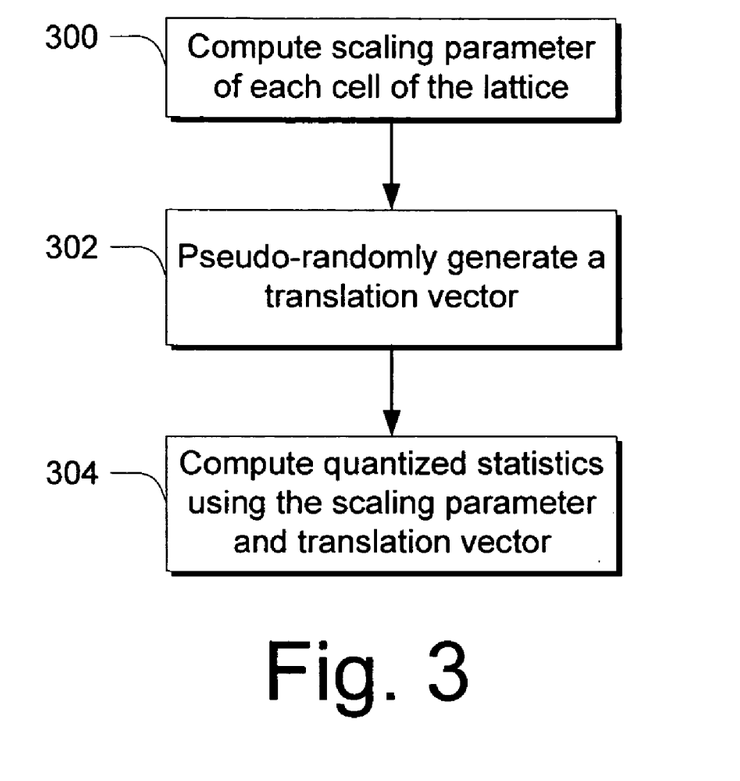
FIG. 3 is a flow diagram that describes steps in a method in accordance with one embodiment.

Accordingly, step 300 computes a scaling parameter of each cell of the lattice. Given the distortion constraint $\beta$ and the lattice parameter $\alpha$, the method finds $\Delta$ (the scaling parameter of each cell of the lattice). In one embodiment, a codebook look-up method is used in order to find $\Delta$ to match a given $\beta$ and $\alpha$. In the present example, the codebook is prepared offline.

Step 302 pseudo-randomly generates a translation vector. In the illustrated and described embodiment, a translation vector t is generated, where $t_i$ is a realization of uniform distribution in [0, 100], $1 \leq i \leq m$.

Step 304 computes quantized statistics using the scaling parameter and the translation vector. In the illustrated and described embodiment, quantized statistics are given by $b=R_m(a/\Delta+t, \alpha)-t$, where $R_m(\cdot,\alpha)$ refers to a quantization algorithm for the unit-cell symmetric lattice $L_m(\alpha)$ of dimension m and parameter $\alpha$; the class of symmetric lattices and a quantization algorithm $R_m(\cdot,\alpha)$ was explained in detail above.

Having lattice quantized the pseudo-random linear statistics, the process now computes a watermark using the quantized pseudo-random linear statistics. This aspect of the process is explored in the next sub-section.

Computation of Watermark

Figure 4:
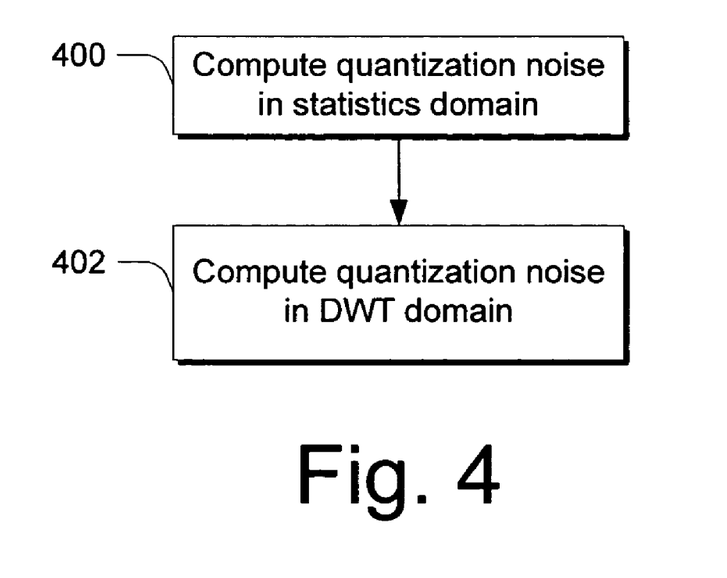
FIG. 4 is a flow diagram that describes steps in a method in accordance with one embodiment.

FIG. 4 is a flow diagram that describes steps in a method of computing a watermark and embellishes the process of step 106 in FIG. 1.

Step 400 computes the quantization noise in the statistics domain. In the illustrated and described embodiment, the quantization noise in this domain is given as $q=b-a$, where a constitutes the previously-computed pseudo-random linear statistics and b constitutes the quantized statistics computed just above.

Step 402 then computes the quantization noise in the discrete Wavelet transform (DWT) domain. In the illustrated and described embodiment, given q, the method computes the quantization noise W (size n×n) in the DWT domain as follows. First, the method generates the projection matrix D (size k×n²) for the subspace that is orthogonal to the subspace spanned by all size n×n matrices that are band-limited to frequency $0<f_{wm}<1$ (k is uniquely determined given $f_{wm}$).

Having generated the projection matrix D, the quantization noise in vector form w (size n²×1) is given by $$w=\tilde{T}^T(\tilde{T}\tilde{T}^T)^{-1}\tilde{q},$$

where $(\cdot)^T$ is the transpose operator, $\tilde{T}^T \triangleq [T^T D^T]$ (size m+k× n²), $\tilde{q}^T \triangleq [q^T 0^T]$ (size m+k×1), 0 is the all-0 vector of size k × 1. The method then re-arranges w in order to obtain size n×n W.

In the presently-described example, W constitutes the computed watermark that is to be embedded in the image.

Embedding the Watermark

Having computed the watermark as noted above, the process next embeds the watermark in the image. In the illustrated and described embodiment, this is accomplished as follows. The watermarked DWT-LL subband is given by $X=S+W$, where S constitutes the image I after having the above-described 3-level discrete wavelet transform applied. Applying the inverse DWT to the combination of X and other unchanged subbands from step 100 in FIG. 1 will obtain the watermarked image.

Additional Considerations and Remarks

It can be shown that the quantization noise in vector form $w=\tilde{T}^T(\tilde{T}\tilde{T}^T)^{-1}\tilde{q}$ is the unique solution to the following optimization problem:

$$\min_w \|w\| \quad s.t. \quad Tw=q \text{ and } Dw=0.$$

We would like to find w in the DWT domain such that it satisfies both $Tw=q$ and $Dw=0$ (the second constraint imposes a "smoothness" constraint on w in some sense and is important for perceptual purposes). The solution given by $w=\tilde{T}^T(\tilde{T}\tilde{T}^T)^{-1}\tilde{q}$, is the minimum L2-norm quantization noise that satisfies both of these constraints. We assume that $\tilde{T}$ is full-rank, which is almost always satisfied in practice according to our experiments.

We discovered that computing $U^{-1}(U \triangleq \tilde{T}\tilde{T}^T)$ could be costly when k+m is large and k>>m. In this case, the following result is useful:

Lemma 3.1 Given the real matrix M:

$$M = \begin{bmatrix} A_{11} & A_{12} \\ A_{21} & A_{22} \end{bmatrix},$$

where $A_{11}$ is m×m, $A_{22}$ is n×n, $A_{12}$ is m×n, $A_{21}$ is n×m, m≠n in general, we have $$M^{-1} = \begin{bmatrix} B & -A_{11}^{-1}A_{12}C \\ -A_{22}^{-1}A_{21}B & C \end{bmatrix}$$

where $B=(A_{11}-A_{12}A_{22}^{-1}A_{21})^{-1}$, $C=(A_{22}-A_{21}A_{11}^{-1}A_{12})^{-1}$, assuming $A_{11}$ and $A_{22}$ are both invertible.

Applying this result to U, we obtain:

$$U^{-1} = \begin{bmatrix} B & -BA_{21}^T \\ -A_{21}B & C \end{bmatrix},$$

where $B=(A_{11}-A_{21}^T A_{21})^{-1}$, $C=(I_n-A_{21}A_{11}^{-1}A_{21}^T)^{-1}$, $A^{11}=TT^T$ and $A_{21}=DT^T$ since rows of D are orthogonal byconstruction.

Next, we provide a mark detection algorithm that is "blind", i.e., the detection algorithm assumes presence of the key, but not the unmarked source. We assume that the secret key K is known at the detector. As in the embedder, K is used as the seed of a pseudo-random generator in the randomized steps of the algorithms. The algorithmic description is given just below.

First, given an input image I', follow the exact same steps 100, 102, 104 in FIG. 1 to find the quantization noise q'. Next, compute $d=\|q'\|$. If $d<\tau$, declare the image as "watermarked"; otherwise declare the image as "unwatermarked".

Note that in the detection algorithm, the L2 distance of the statistics vector of the received signal to the nearest lattice point is used as the decision statistics. It can be shown that this detection rule is optimal in the sense of probability of error for an AWGN attack channel; this is a standard result from detection theory.

Experimental Results and Discussion

Figure 5:
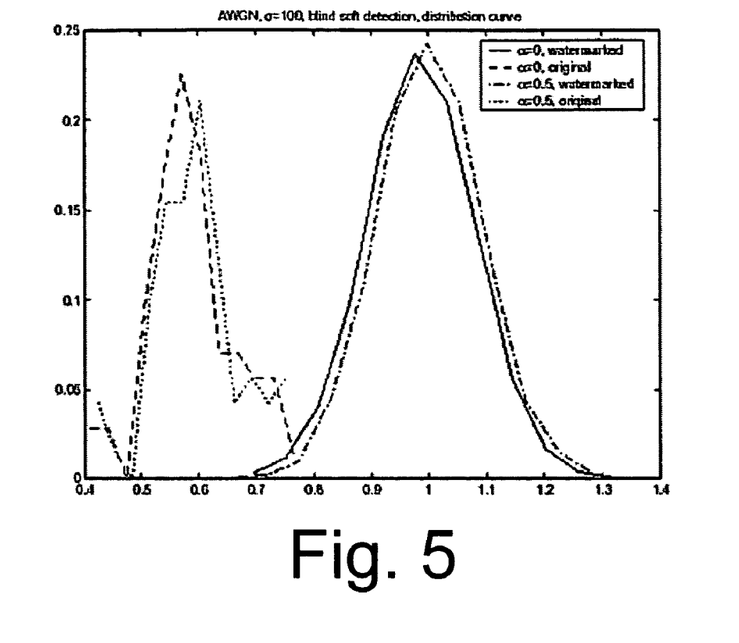
FIG. 5 is a graph of an operational distribution for a soft detector output for a number of random image and key pairs and is useful for understanding aspects of the described embodiments.

FIG. 5 illustrates the operational distribution of the soft detector output for 5000 random image and key pairs with AWGN attack of standard deviation 100. Solid and dashed lines show the soft detector output for watermarked and un-watermarked images for $\alpha=0$; dash-dotted and dotted lines show the soft detector output for watermarked and un-watermarked images for $\alpha=0.5$.

We experimentally compared different types of symmetric lattices for the watermarking problem in the sense of operational probability of error. In our experiments, we used randomly chosen images from an image database of size 4000 with randomly chosen keys. For each chosen image and key, we computed the distance to the nearest lattice point (i.e., the value of d given in the detection part of the "Mark Embedding" section above) for the cases of watermarked and un-watermarked images.

In practice, thresholding is applied to the distance d which yields the decision of "waternarked" or "unwatermarked" at the detector. It can be shown that this detection rule is optimal in the sense of probability of error for memoryless attacks with identical distribution.

Figure 6:
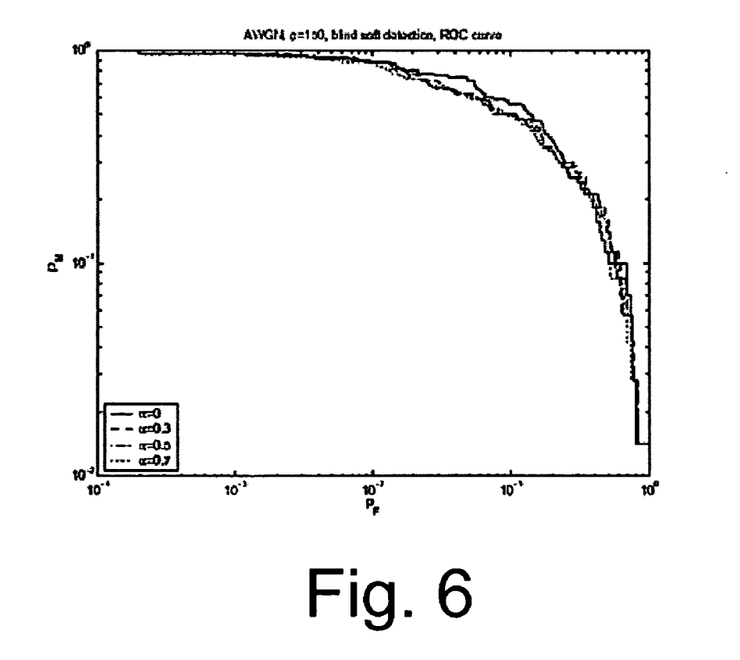
FIG. 6 is a graph of the operational ROC curves for a number of random image and key pairs and is useful for understanding aspects of the described embodiments.

We carried out experiments for a total of 5000 trials (i.e., 5000 randomly chosen image and key pairs are used to produce results). The quantization parameter Δ is chosen such that the watermarking distortion (in the L2 sense) is approximately the same (and equal to a user-specified value) for all cases. In FIG. 5, we show distribution of the soft detector output (i.e., d) where the attack is AWGN (additive white Gaussian noise) with standard deviation 100. The solid (resp. dash-dotted) line shows the detector output for watermarked images for α=0 (resp. α=0.5). The dashed (resp. dotted) line shows the detector output for un-watermarked images for α=0 (resp. α=0.5). In FIG. 6, we show the ROC curves of the detector where the attack is AWGN with standard deviation 150. The horizontal (resp. vertical) axis shows the probability of false alarm (resp. probability of miss). The solid, dashed, dash-dotted, and dotted lines correspond to symmetric lattices with α parameters 0, 0.3, 0.5 and 0.7 respectively. Although the value of α=0.5 is shown to be optimal in the sense of yield, we experimentally observed that the performances of symmetric lattices with different values of α are approximately the same for a wide class of attacks, see, e.g., FIGS. 5 and 6. Note that, this includes the orthogonal lattice (α=0) which corresponds to uniform scalar quantization.

Exemplary System

Figure 7:
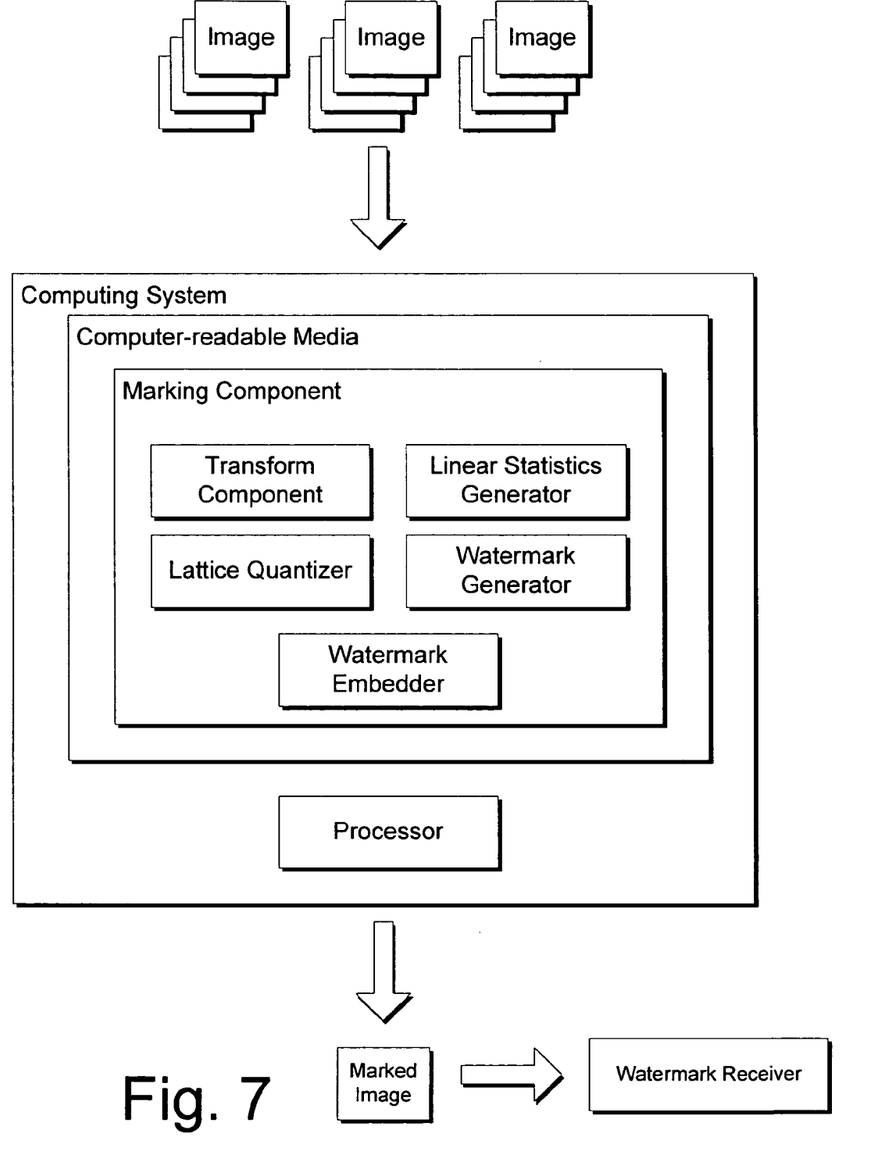
FIG. 7 is a block diagram of an exemplary computing system that can be used to implement the embodiments described herein.

FIG. 7 illustrates an exemplary system in which the above-described embodiments can be employed. In the illustrated example, a computing system 700 comprises a marking component 702 which is utilized to mark images as described above. Marking component 702 can be implemented in connection with any suitable hardware, software, firmware or combination thereof. In the illustrated and described embodiment, marking component 702 is implemented in software. Accordingly, the marking component can reside in the form of computer-readable instructions on one or more computer-readable media which are executable by a processor.

In this example, marking component 702 comprises a transform component 704, a linear statistics generator 706, a lattice quantizer 708, a watermark generator 710 and a watermark embedder 712. It is to be appreciated and understood that while each of these components is illustrated as a separate component, such need not necessarily be the case in practice.

In operation, digital images are received into system 700 and are processed to provide watermarked images. In the present example, transform component 704 is configured to operate in a manner that corresponds to the processing described in step 100 of FIG. 1. Linear statistics generator 706 is configured to operate in a manner that corresponds to the processing described in step 102 of FIG. 1 and in FIG. 2. Lattice quantizer 708 is configured to operate in a manner that corresponds to the processing described in step 104 of FIG. 1 and in FIG. 3. Watermark generator 710 is configured to operate in a manner that corresponds to the processing described in step 106 of FIG. 1 and FIG. 4. Watermark embedder 712 is configured to operate in a manner that corresponds to the processing described in step 108 of FIG. 1.

Once the image is marked with a suitable watermark, the image can be received and processed by a watermark receiver 714 as described above. The watermark receiver typically comprises a component of an application such as Windows® Media Player.

CONCLUSION

The illustrated and described embodiments provide improved watermarking and data embedding systems and methods that are resistant to several natural signal processing transforms that can be effected such as those used by commercial products for manipulating images, videos and audio signals by users as well as malicious attacks.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
producing a symmetric lattice;
quantizing, with the symmetric lattice, statistics associated with an image that is to be watermarked;
using the quantized statistics to compute a watermark; and
using the computed watermark to mark an associated image, wherein the act of computing the statistics associated with the image comprises
selecting one or more regions of the image;
generating weights associated with each region;
forming a transformation matrix;
using the transformation matrix and the generated weights to compute the statistics.

2. The method of claim 1 further comprising computing pseudo-random statistics for a plurality of selected regions of the image, said pseudo-random statistics being quantized by said act of quantizing.

3. The method of claim 2, wherein said selected regions comprise square regions.

4. One or more computer-readable media having computer-readable instructions thereon which, when executed by a computer, implement the method of claim 1.

5. A computer-implemented method comprising:
applying a transform on an image that is to be watermarked;
computing statistics associated with the image;
lattice quantizing the computed statistics with a symmetric lattice; and
computing a watermark using the lattice quantized statistics, wherein said act of computing statistics comprises:
selecting one or more regions of the image;
generating weights associated with each region;
forming a transformation matrix;
using the transformation matrix and the generated weights to compute the statistics.

6. The method of claim 5, wherein said act of applying comprises applying a 3-level discrete wavelet transform on the image.

7. The method of claim 5, wherein said act of computing statistics comprises computing pseudo-random linear statistics associated with the image.

8. The method of claim 5, wherein said act of selecting one or more regions comprises selecting one or more pseudo-random regions.

9. The method of claim 5, wherein said one or more regions comprise square regions.

10. The method of claim 5, wherein said act of generating weights comprises generating pseudo-random weights associated with each region.

11. The method of claim 5, wherein said act of lattice quantizing the computed statistics further comprises:
computing a scaling parameter of each cell of the lattice;
pseudo-randomly generating a translation vector; and
computing quantized statistics using the scaling parameter and the translation vector.

12. The method of claim 11, wherein said act of computing a scaling parameter comprises using a codebook to find a scaling parameter for a given distortion constraint and lattice parameter.

13. The method of claim 5, wherein said act of computing a watermark comprises:
computing quantization noise in the statistics domain; and
using the quantization noise in the statistics domain, computing quantization noise in the DWT domain.

14. The method of claim 5 further comprising embedding the computed watermark in the image.

15. One or more computer-readable media having computer-readable instructions thereon which, when executed by a computer, implement the method of claim 5.

16. A computing system embodying the computer-readable media of claim 15.

17. A computer-implemented method comprising:
applying a 3-level discrete wavelet transform on an image that is to be watermarked;
computing pseudo-random linear statistics associated with the image by:
selecting one or more pseudo-random square regions of the image;
generating pseudo-random weights associated with each region;
forming a transformation matrix; and
using the transformation matrix and the generated weights to compute the statistics;
lattice quantizing the computed statistics using a symmetric lattice by:
computing a scaling parameter of each cell of the lattice;
pseudo-randomly generating a translation vector;
computing quantized statistics using the scaling parameter and the translation vector;
computing a watermark using the lattice quantized statistics; and
embedding the computed watermark in the image.

18. One or more computer-readable media having computer-readable instructions thereon which, when executed by a computer, implement the method of claim 17.

19. A computing system embodying the computer-readable media of claim 18.

20. A system comprising:
one or more computer-readable media;
a transform component embodied on the one or more computer-readable media and configured to apply a transform on an image that is to be watermarked;
a statistics generator embodied on the one or more computer-readable media and configured to compute statistics associated with the image;
a lattice quantizer embodied on the one or more computer-readable media and configured to lattice quantize the computed statistics using a symmetric lattice;
a watermark generator embodied on the one or more computer-readable media and configured to compute a watermark using the lattice quantized statistics; and
a watermark embedder embodied on the one or more computer-readable media and configured to embed the computed watermark in-the image,
wherein the statistics generator is configured to:
select one or more regions of the image;
generating weights associated with each region;
form the transformation matrix;
use the transformation matrix and the generated weights to compute the statistics.

21. The system of claim 20, wherein the transform component is configured to apply a 3-level discrete wavelet transform on the image.

22. The system of claim 20, wherein the statistics generator is configured to compute pseudo-random linear statistics associated with the image.

23. The system of claim 20, wherein the statistics generator is configured to select one or more pseudo-random regions.

24. The system of claim 20, wherein the statistics generator is configured to select one or more square regions.

25. The system of claim 20, wherein the statistics generator is configured to generate pseudo-random weights associated with each region.

26. The system of claim 20, wherein the lattice quantizer is configured to lattice quantize the computed statistics by:
computing a scaling parameter of each cell of the lattice;
pseudo-randomly generating a translation vector; and
computing quantized statistics using the scaling parameter and the
translation vector.

27. The system of claim 20, wherein the watermark generator is configured to compute the watermark by:
computing quantization noise in the statistics domain; and
using the quantization noise in the statistics domain, computing quantization noise in the DWT domain.

28. A system comprising:
means for applying a transform on an image that is to be watermarked;
means for computing statistics associated with the image;
means for lattice quantizing the computed statistics with a symmetric lattice;
means for computing a watermark using the lattice quantized statistics; and
means for embedding the computed watermark in the image, wherein said means for lattice quantizing the computed statistics further comprises:
mean for computing a scaling parameter of each cell of the lattice;
means for pseudo-randomly generating a translation vector; and
means for computing quantized statistics using the scaling parameter and the translation vector.

29. The system of claim 28, wherein said means for applying comprises means for applying a 3-level discrete wavelet transform on the image.

30. The system of claim 28, wherein said means for computing statistics comprises means for computing pseudo-random linear statistics associated with the image.

31. The system of claim 28, wherein means for computing statistics comprises:
means for selecting one or more regions of the image;
means for generating weights associated with each region;
means for forming a transformation matrix; and
means for using the transformation matrix and the generated weights to compute the statistics.

32. The system of claim 31, wherein said means for selecting one or more regions comprises means for selecting one or more pseudo-random square regions.

33. The system of claim 31, wherein said means for generating weights comprises means for generating pseudo-random weights associated with each region.

34. The system of claim 28, wherein said means for computing a watermark comprises:

means for computing quantization noise in the statistics domain; and means for computing quantization noise in the DWT domain using the quantization noise in the statistics domain.

35. The system of claim 28, wherein all of said means comprise one or more computer readable media having computer-readable instructions embodied thereon.

36. A computer-implemented method comprising:

receiving an image that has been watermarked with a mark that has been formed through a symmetric lattice quantization process;

computing statistics associated with the image wherein said act of computing statistics comprises:

selecting one or more regions of the image;

generating weights associated with each region;

forming a transformation matrix;

using the transformation matrix and the generated weights to compute the statistics;

and ascertaining, from the watermarked image, whether the image is or is not watermarked.

* * * * *

UNITED STATES PATENT AND TRADEMARK OFFICE
CERTIFICATE OF CORRECTION

| | | |
|---|---|---|
| PATENT NO. | : 7,356,161 B2 | |
| APPLICATION NO. | : 10/858967 | |
| DATED | : April 8, 2008 | |
| INVENTOR(S) | : Kamal Jain et al. | |

It is certified that error appears in the above-identified patent and that said Letters Patent is hereby corrected as shown below:

In column 13, line 67, in Claim 20, delete "in-the" and insert -- in the --, therefor.

Signed and Sealed this
Fifteenth Day of February, 2011

David J. Kappos
*Director of the United States Patent and Trademark Office*